United States Patent [19]

Zierhut

[11] Patent Number: 4,479,056

[45] Date of Patent: Oct. 23, 1984

[54] MOTION DETECTOR FOR SPACE SURVEILLANCE

[75] Inventor: Hermann Zierhut, Munich, Fed. Rep. of Germany

[73] Assignee: Richard Hirschmann Radiotechnisches Werk, Esslingen am Neckar, Fed. Rep. of Germany

[21] Appl. No.: 379,079

[22] Filed: May 17, 1982

[30] Foreign Application Priority Data

May 18, 1981 [DE] Fed. Rep. of Germany ....... 3119720

[51] Int. Cl.[3] .............................................. G01J 5/08

[52] U.S. Cl. .................................... 250/342; 250/353

[58] Field of Search ....................... 250/342, 221, 353; 340/567

[56] References Cited

U.S. PATENT DOCUMENTS

| | | | |
|---|---|---|---|
| 3,864,566 | 2/1975 | Simpson et al. | 250/216 |
| 3,923,382 | 12/1975 | Harding | 350/296 |
| 3,958,118 | 5/1976 | Schwarz | 250/221 |
| 4,087,688 | 5/1978 | Keller | 250/342 |
| 4,268,752 | 5/1981 | Herwig et al. | 250/353 |
| 4,385,833 | 5/1983 | Gardner | 356/141 |

FOREIGN PATENT DOCUMENTS

| | | |
|---|---|---|
| 2103909 | 8/1971 | Fed. Rep. of Germany . |
| 2645040 | 11/1977 | Fed. Rep. of Germany . |
| 2836462 | 3/1980 | Fed. Rep. of Germany . |

*Primary Examiner*—Janice A. Howell
*Assistant Examiner*—Constantine Hannaher
*Attorney, Agent, or Firm*—Karl F. Ross

[57] ABSTRACT

A motion detector responsive for infrared radiation, e.g. to use in burglar-alarm installations, comprises an elongate frustopyramidal box with an entrance opening at one end, a concave mirror at the opposite end and four flat, internally reflecting longitudinal walls, two of them converging toward the entrance end on opposite sides of a plane of symmetry with which they include an angle between about 8° and 15°. A pyroelectric radiation sensor near the entrance end, lying in the vicinity of the focal point of the concave mirror, is disposed for illumination by beams of parallel rays in a limited number of fields of view; these beams approach the entrance end at different azimuthal angles, included with the preferably vertical plane of symmetry, but occupy closely adjoining regions inside the box. A planar deflector at the entrance end, bisected by the plane of symmetry, also establishes a limited number of elevational angles for the beams focused upon the radiation sensor.

13 Claims, 5 Drawing Figures

MOTION DETECTOR FOR SPACE SURVEILLANCE

FIELD OF THE INVENTION

My present invention relates to a motion detector used to survey a predetermined space, e.g. as part of a burglar-alarm installation.

BACKGROUND OF THE INVENTION

The type of motion detector here considered comprises a device for sensing incident radiation, usually infrared rays, which may be emitted by an associated source elsewhere in the space under surveillance and whose interruption by an intruder sets off an alarm. Alternatively, such a device can be used to sense heat waves from the body of the intruding person.

In either case, the motion detector is designed to respond only to changes in the intensity of the incident radiation. It is therefore desirable to subdivide the surveyed spaced into a number of relatively narrow fields of view in which a given disturbance causes a more pronounced intensity variation. Reference in this connection may be made, for example, to U.S. Pat. No. 3,923,382 according to which a multifaceted concave mirror focuses radiation from respective fields of view onto a single sensing element. See also U.S. Pat. Nos. 3,958,118 and 4,268,752 as well as German printed specification (Auslegeschrift) No. 26 45 040 and German published application (Offenlegungsschrift) No. 21 03 909.

In U.S. Pat. No. 4,087,688 as well as in my prior German application No. 28 36 462 (published Mar. 6, 1980) there is further disclosed a somewhat simplified focusing system for the purpose referred to in which beams incident at certain angles are focused by a refractive or reflective optical system onto a single sensor via a prismatic or cylindrical housing with reflecting internal wall surfaces extending parallel to the optical axis. The angles of incidence for which this is true are given by arctannd/f where d is the inner diameter or width of the housing, n is an integer (0, 1, 2 etc.) and f is the distance between the sensor and a point of intersection of all the beams on the axis at the housing entrance. The angular separation of the beams decreases with increasing values of n while their internally reflected rays strike the receiving area of the sensor at progressively larger angles to the optical axis. Thus, detection of motion becomes less certain with increasing distance from that axis.

OBJECTS OF THE INVENTION

The general object of my present invention is to provide an improved motion detector of the type discussed hereinabove in which the aforementioned drawbacks are obviated.

A more particular object is to provide a motion detector which is of simple construction and can be made sufficiently compact to be unobstrusively placed in, say, a corner of a room to be surveyed, e.g. in a manner similar to that of a concealed wall socket.

It is also an object of my invention to provide means in such a motion detector for irradiating a single spherically concave mirror with a three-dimensional array of incoming parallel-ray beams for an effective monitoring of the space under surveillance.

SUMMARY OF THE INVENTION

In accordance with my present invention I provide an elongate four-sided frustopyramidal box with two pairs of longitudinal walls, namely a first pair bisected by a plane of symmetry and a second pair converging toward that plane from a remote end of the box toward an entrance end accessible to incident radiation; at least the walls of the second pair, but preferably those of both pairs, have reflecting inner surfaces. A concave radiation reflector at the remote end of this radiation-guiding box has a vertex in the plane of symmetry and further has a focus near the entrance end. A radiation sensor, confronting the concave reflector in the vicinity of its focus, is illuminated by incident beams of parallel rays approaching the entrance end of the box at a plurality of predetermined angles of inclination relative to the plane of symmetry, referred to hereinafter for convenience as azimuthal angles, and reflected one or more times inside the box by either or both of the walls of the second pair; the radiation sensor has a receiving area which is substantially narrower than the entrance end at least in a direction perpendicular to the plane of symmetry.

Pursuant to a more particular feature of my invention, the width of the box is so chosen with reference to an angle of convergence $\alpha$ (included between either wall of the second pair and the plane of symmetry) that incoming beams traversing the entrance end at azimuthal angles constituting odd multiples of $\alpha$, given by $\pm(2n+1)\alpha$ where n is one of the integers 0, 1, 2 . . . but preferably not greater than 3, undergo n reflections at the second pair of walls before reaching the reflector. As will be shown in greater detail hereinafter, such an arrangement allows the beams incoming at these different azimuthal angles to occupy adjacent regions within the box and to illuminate closely adjoining areas of the concave end reflector, provided the entrance end has a width suitably related to the length of the box as measured from the entrance end to the vertex of that reflector. Rays lying outside the aforementioned range of azimuthal angles, namely those with angles of incidence equal or close to zero and those for which n exceeds the maximum value of preferably 3, may be blocked at the entrance end by suitable shield means; rays incident at angles of intermediate values, including even multiples of $\alpha$, will not be properly focused. I have found that an optimum value of $\alpha$ lies between about 8° and 15° and that, with $\alpha \approx 8.5°$, a suitable ratio for the entrance-end width and the box length is substantially 1:5.

My invention, in its most general aspects, is applicable to a system requiring surveillance only in two dimensions in which case the concave reflector may be cylindrically curved, its vertex and its focus being then a pair of parallel lines in the aforementioned plane of symmetry. For 3-dimensional surveillance, however, the reflector should be spherically concave with its vertex and its focus lying on an optical axis which preferably extends along the inner surface of one of the walls of the first pair, these two walls then being also internally reflective. For such 3-dimensional surveillance the entrance end of the radiation-guiding box should be provided with a planar reflector disposed at an angle of inclination $\beta$ relative to the optical axis; advantageously, $\beta \approx 35°$. This allows the incident beams of parallel rays to be angularly spread out not only in a direction transverse to the plane of symmetry, by the aforementioned azimuthal angles, but also in a direction parallel to that plane by what will be termed elevational angles for convenience. In practice, the optical axis may be substantially vertical in which instance the terms "azimuthal" and "elevational" will have their actual geographic significance.

As the beams with the specified angles of incidence converge in a common point after reflection by the concave end mirror, I prefer to dispose the receiving surface of the radiation-sensing means in a transverse plane spaced from the focus of that end mirror by a finite distance substantially less than its focal length f whereby each beam is separately imaged on a respective zone of this receiving area. With the width w of the entrance end of the radiation-guiding box so chosen as to let incident beams of different azimuthal angles illuminate closely adjoining areas of the end mirror, as noted above, the distance between the plane of the receiving area and the focal plane of the end mirror is advantageously equal to substantially $f(1+d/w)$ where d is the width of any of the zones of the receiving area assigned to a particular beam angle; this will allow the several receiving zones to be closely juxtaposed on the radiation-sensing device. While the distance of the receiving area from the mirror vertex could be less or greater than the focal length f for this purpose, it will generally be more convenient to dispose the sensor ahead of the focal plane as seen in the direction of the incoming beams.

BRIEF DESCRIPTION OF THE DRAWING

The above and other features of my invention will now be described in detail with reference to the accompanying drawing in which.

SPECIFIC DESCRIPTION

Figure 1:
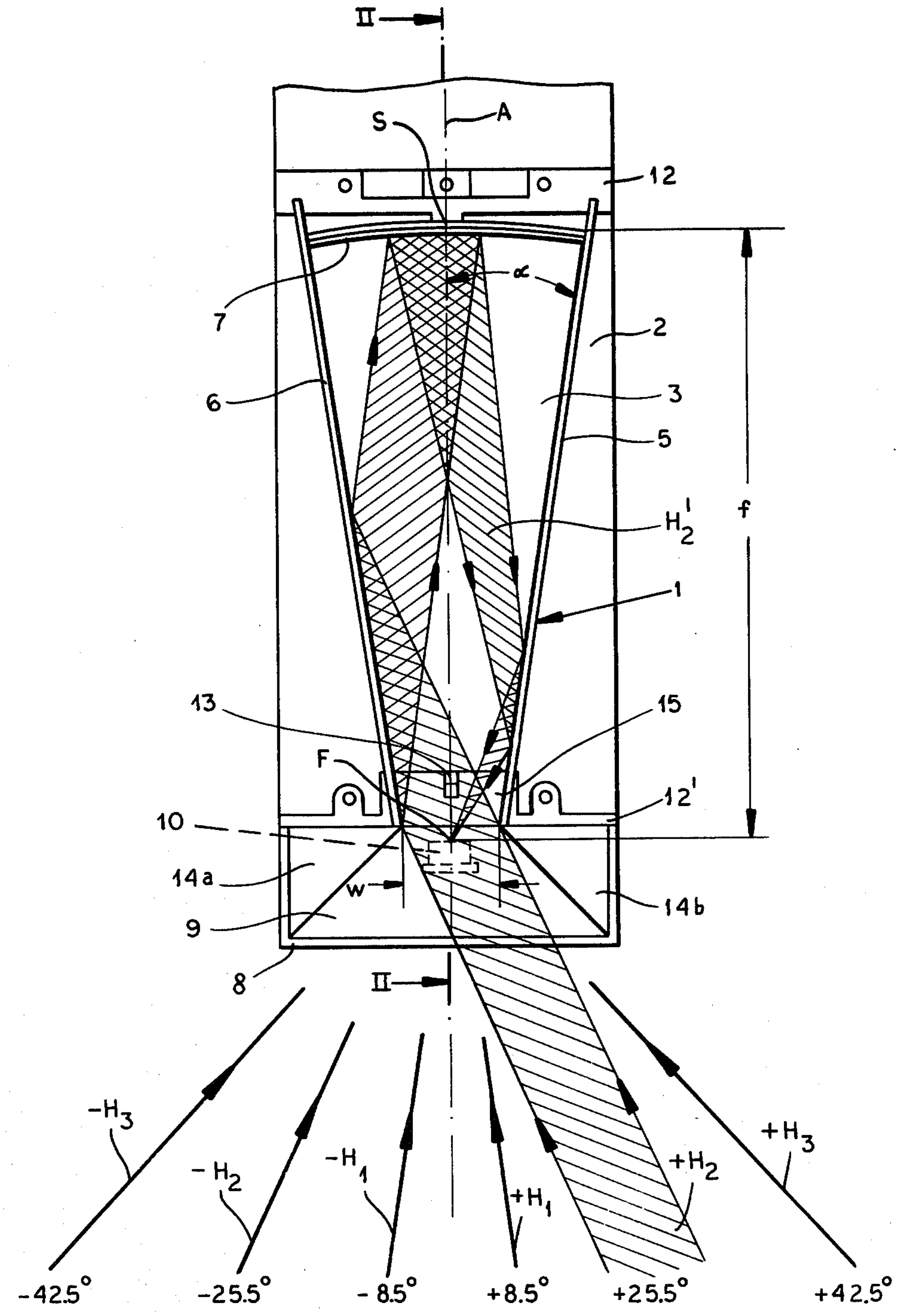
FIG. 1 is a front-elevational view of a motion detector according to my invention, including a radiation-guiding box with its front wall removed.
Figure 2:
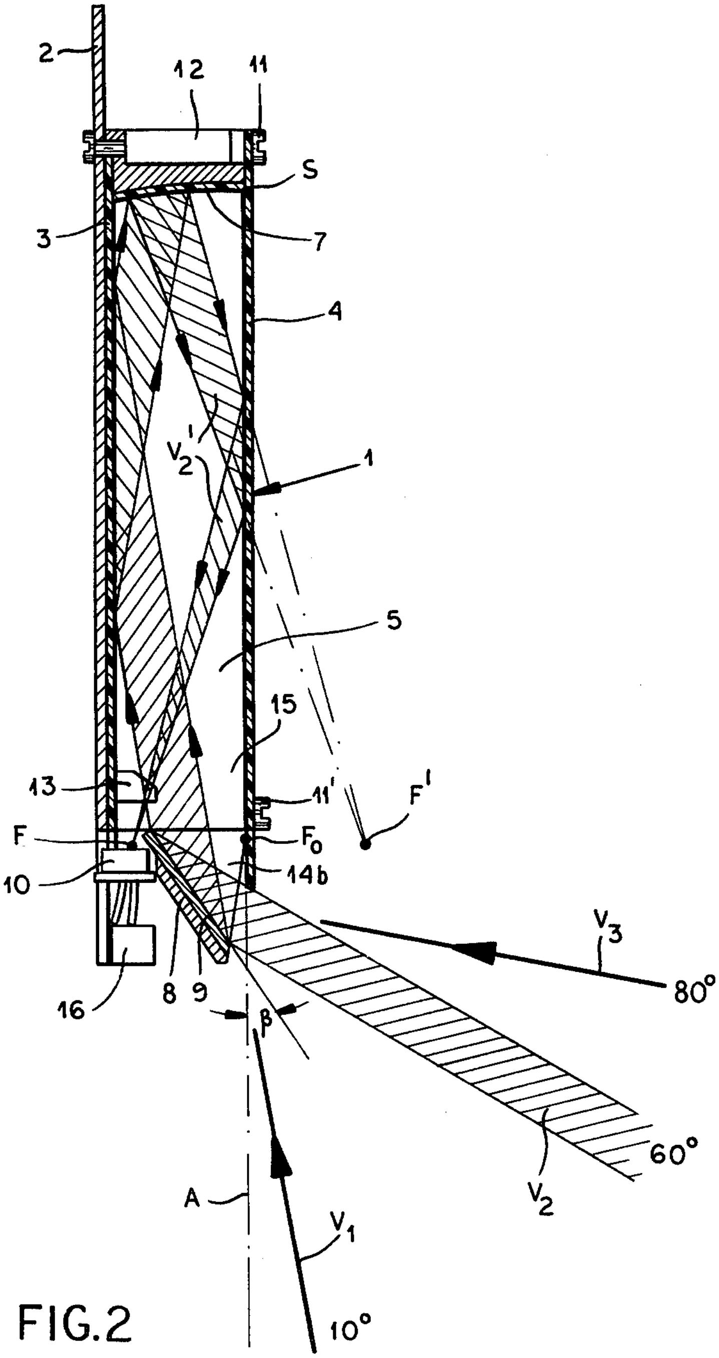
FIG. 2 is a cross-sectional view taken on the line II—II of FIG. 1.

In FIGS. 1 and 2 I have shown a motion detector comprising a mounting plate 2 which may be fastened to a wall of a room to be surveyed and which also carries a control unit 16 containing conventional circuitry, not further illustrated, for energizing a pyroelectric radiation-sensing device 10 and for converting a detected radiation change into an alarm signal when the system has been placed in its monitoring state. For burglar-alarm purposes, for example, the detector could be mounted at an elevated level in a corner of the room under surveillance.

The motion detector comprises a radiation-guiding box 1 of frustopyramidal configuration, with a rear wall 3 adjoining the mounting plate 2, a front wall or cover 4 removed in FIG. 1 and a pair of lateral walls 5, 6 converging downwardly toward a narrower entrance end 15 from a wider end closed by a spherically concave mirror or reflector 7. The box 1 is secured to plate 2 by an upper bracket 12 and a lower bracket 12′ to which the front cover 4 is removably fastened by respective screws 11, 11′. Bracket 12 further serves as a backing for the reflector 7. All four walls 3–6 have radiation-reflecting inner surfaces.

Figure 3:
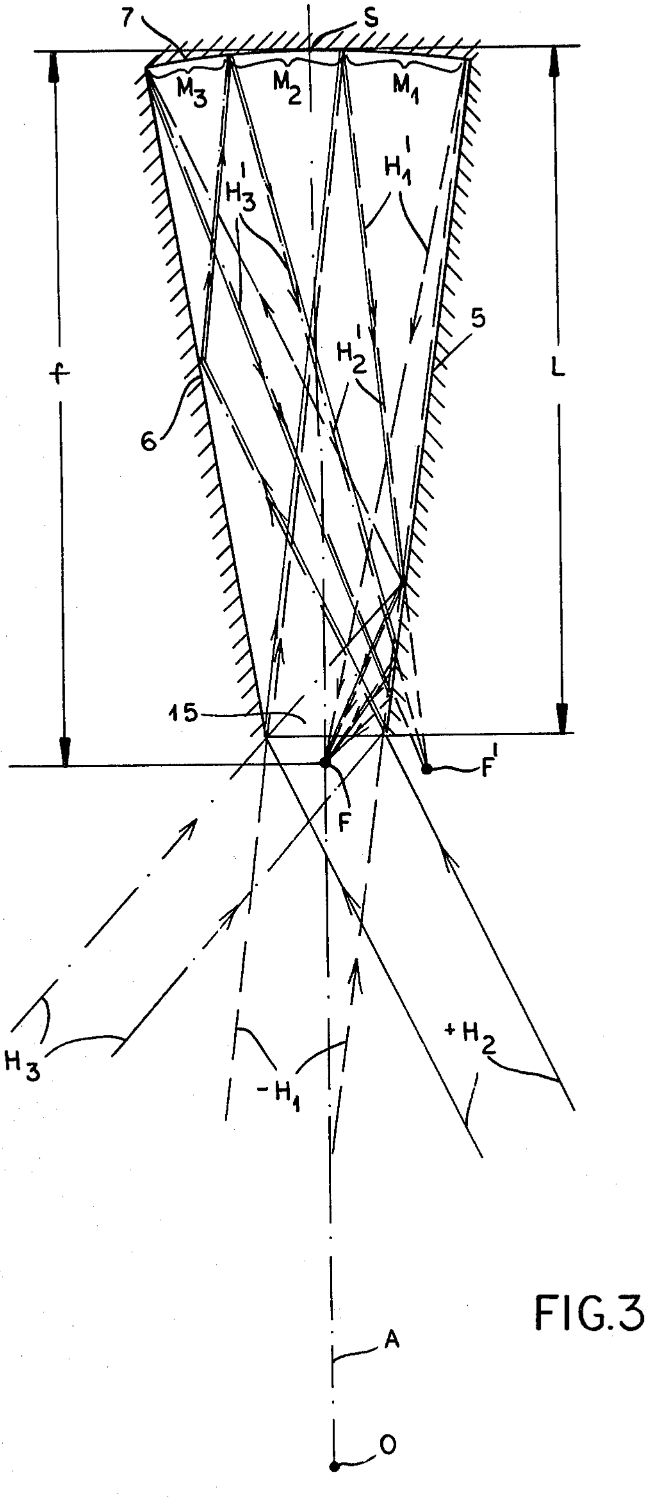
FIG. 3 is a somewhat schematic view of the radiation-guiding box of FIG. 1, showing the path of several incident beams.

The vertex S of end reflector 7 lies on an optical axis A which extends vertically along the inner wall surface of front cover 4 and, in FIG. 1, coincides with the position of a vertical plane of symmetry; axis A also passes through the center of curvature 0 of reflector 7, indicated in FIG. 3, whose radius corresponds to twice the focal length f of that reflector as is the case with any spherical mirror. While the true focal point $F_o$ of reflector 7 lies next to the entrance end on the same axis, the radiation sensor 10 is mounted on the plate 2 and is thus somewhat offset from that focal point. In fact, the sensor is shielded from interfering radiation (possibly including short-wave radio signals or atmospheric disturbances) by a planar mirror or deflector 9 of trapezoidal outline which is carried on a sloping shelf 8 and is interposed between sensor 10 and axis A; mirror 9 includes with that axis an angle of inclination $\beta=35°$. Walls 5 and 6 include with axis A and thus with the vertical plane of symmetry an angle of convergence $\alpha=8.5°$.

Mirror 9 is located in front of the rectangular entrance end 15 of box 1 and projects below the bottom edge of cover 4 so as to direct incident beams to the interior of the box. FIG. 2 shows parallel-ray beams $V_1$, , $V_2$ and $V_3$ inclined to the vertical at different elevational angles of 10°, 60° and 80°, respectively; beam $V_2$ is shown in its full width whereas beams $V_1$ and $V_3$ have been represented only by their centerlines. Beam $V_2$ is deflected by the planar mirror 9 toward rear wall 3 reflecting it to the concave end mirror 7 which focuses it as a convergent beam $V'_2$ onto a virtual image F′ of a point F here assumed to lie on the receiving area of sensor 10; advantageously, however, the point F (referred to hereinafter as the pseudofocus) is located somewhat ahead of that receiving area as will be described with reference to FIG. 4. The rays of beam $V_2$, after bouncing off the front cover 4, are therefore concentrated on the receiving area of the sensor which emits an electrical signal proportional to their intensity; an evaluator in the control unit 16 generates an alarm upon detecting a significant change in the magnitude of that signal (which in some instances could be normally at zero value).

Each of the beams $V_1$–$V_3$ illustrated in FIG. 2 is, in fact, representative of several such beams incident at different azimuthal angles, here specifically a group of six parallel-ray beams designated $+H_1$, $+H_2$, $+H_3$ and $-H_1$, $-H_2$, $-H_3$ in FIG. 1. the azimuthal angles, which are the same for each of the three beam positions seen in FIG. 2, are $\pm8.5°=\alpha$ for beams $H_1$, $\pm25.5°=3\alpha$ for beams $H_2$, and $\pm42.5°=5\alpha$ for beams $H_3$. Again, only one beam ($+H_2$) has been fully traced in FIG. 1 while the other five are represented only by their centerlines. Not illustrated are two further beams, of azimuthal angles $+59.5°=a$, which could also be utilized in such a motion detector as discussed hereinafter.

The device shown in FIGS. 1 and 2 therefore monitors 18 or possibly 24 discrete fields of view in a space under surveillance which in a horizontal plane are separated by uniform azimuthal angles of $17°=2\alpha$. Thus, with motion detector 1 positioned approximately at the level of a man's head, an intruder walking erect will be intercepted by at least one of the beams of group $V_2$ or $V_3$, depending on his distance from the motion detector, while a person crouching in the vicinity of that detector will have to pass through at least one of the beams of group $V_1$. As noted above, it is immaterial for this purpose whether the beams referred to are actually generated by respective emitters of infrared radiation remote from the motion detector or represent heat waves radiated by the body of a person; in either case, of course, the actual radiation may also be present outside the boundaries of the fields of view symbolized by the illustrated beams.

As particularly illustrated for beam $+H_2$ in FIG. 1, the parallel rays of that beam traversing the entrance end 15 are reflected at lateral wall 6 toward mirror 7 which focuses them into a convergent beam H'2 bouncing off the opposite lateral wall 5 to strike the sensor 10 at (or near) the pseudofocus F. As will be apparent from FIG. 3, the width w of entrance end 15, the focal length f of mirror 7 and the angle of convergence $\alpha$ of its lateral walls 5, 6 are so chosen as to enable the rays of beam $+H_2$ (as well as those of its companion beam $-H_2$) to reach the sensor 10 after two reflections at these lateral walls whereas the rays of beams $+H_1$ and $-H_1$ undergo a single such reflection and those of beams $+H_3$ and $-H_3$ are reflected three times; the aforementioned further beams incident at azimuthal angles $7\alpha$ would experience four such reflections. These reflections at the walls 5, 6 are, of course, independent of the additional reflection or reflections at front wall 4 and/or rear wall 3 whose number depends on the elevational angle of incidence illustrated in FIG. 2. Thus, a beam of group $V_1$ bypasses the planar mirror 9 and is reflected only at front wall 4 after focusing by concave mirror 7 whereas a beam of group $V_3$ is directed by mirror 9 onto front wall 4 which reflects it toward rear wall 3 whence, after striking the mirror 7, its rays are reflected once more by wall 4 on their way to pseudofocus F.

The significance of all the chosen azimuthal and elevational angles is that every one of these 18 or possibly 24 beams will converge, after the proper number of internal reflections, on the same pseudofocus F.

This will become clearer from a contemplation of the ray paths shown in FIG. 3 where beam $-H_1$ passes through the entrance end of box 1 adjacent and parallel to its lateral wall 5, reaching the mirror 7 without striking the opposite wall 6. Mirror 7 sends back a beam $H'_1$ converging toward the virtual pseudofocus F' but bouncing off the wall 5 to reach the actual point F. Beam $+H_2$ strikes the wall 6 at an angle representing the difference between its own azimuthal angle of $2\alpha$ and the angle of convergence $\alpha$ included by that wall with the plane of symmetry coinciding in FIG. 3 with axis A; this beam, therefore, leaves the wall 6 in a direction parallel to the beam $-H_1$ so that mirror 7 concentrates its rays into a beam $H'_2$ converging toward the same virtual pseudofocus F'. Beam $-H_3$ strikes the wall 5 at an angle equaling the difference between its azimuthal angle of $3\alpha$ and the angle of convergence $\alpha$ so as to be reflected toward wall 6 in a direction parallel to the incident beam $+H_2$; the rays of beam $-H_3$ are therefore parallel to those of beams $+H_2$ and $-H_1$ when falling upon mirror 7 which, accordingly, gathers them into a beam $H'_3$ also converging toward the virtual pseudofocus F'. FIG. 3 also shows that the three beams $-H_1$, $+H_2$ and $-H_3$ illuminate three closely adjoining areas $M_1$, $M_2$ and $M_3$ of mirror 7; this is due to a chosen ratio of about 1:5 between the width w of the entrance end 15 and the length L of guide box 1 as measured from that entrance end to the vertex S of mirror 7. Length L in FIG. 3 is slightly less than the focal length f of mirror 7 which in a compact motion detector may be about 10 cm.

The relationships just described are, of course, symmetrically duplicated for the three other beams $+H_1$, $-H_2$ and $+H_3$ shown in FIG. 1. Similar relationships exist for the vertically fanned-out beam positions shown in FIG. 2 where, with $\alpha=35°$, a beam $V_2$ incident at an elevational angle of 60° strikes the mirror 9 at an angle of 25° and the rear wall 3 at an angle of 10°, being thus parallel to the rays of a beam $V_1$ arriving at the same azimuthal angle. On the other hand, a beam $V_3$ incident at such azimuthal angle and at an elevational angle of 80° is directed by mirror 9 onto front cover 4 at an angle of 10° so that its rays reflected by that cover parallel those of beam $V_2$ passing between mirror 9 and wall 3. The rays of all three beams will therefore reach the mirror 7 parallel to one another and will be focused upon the common point F.

In order to accommodate two further beams incident at azimuthal angles of $\pm 59.5°$, as mentioned above, the length L of box 1 would have to be somewhat increased. In that case the beam incident at $\pm 59.5°$ would be reflected by wall 6 toward wall 5 in a direction parallel to the incident beam $-H_3$ so that its rays, after striking the wall 6 once more, would impinge upon an area of mirror 7 to the left of area $M_3$ and would then converge toward the virtual pseudofocus F' so as to be redirected by wall 5 upon the point F. Since, however, the beam width is given by $w \cdot \cos[(2n \pm 1)\alpha]$, it decreases significantly with larger angles of incidence so that the areas of illumination $M_1$, $M_2$ . . . also become progressively narrower. This is why it will be convenient to set a maximum value of n=3 or even, with the dimensions actually given for the preferred embodiment, of n=2. Undesired rays incident at greater azimuthal angles are blocked by lateral shields 14*a*, 14*b* flanking the planar mirror 9; a shield 13 similarly stops rays incident at azimuthal angles between $-8.5°$ and $\pm 8.5°$ on any of the elevational levels illustrated in FIG. 2.

Figure 4:
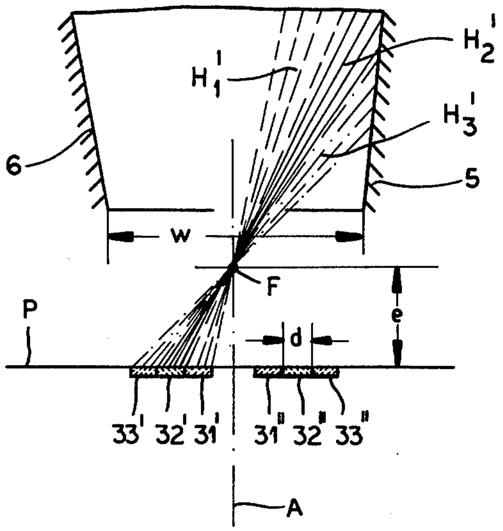
FIG. 4 is a view similar to the lower part of FIG. 3 but drawn to a larger scale to show details of a radiation-receiving area.

FIG. 4 shows a transverse plane P which contains the receiving area of sensor 10 and is seen to be spaced from pseudofocus F by a distance e allowing the reflected beams $H'_1$, $H'_2$, $H'_3$ to diverge for illumination of respective zones 31', 32' and 33' of that area. These zones have about the same width d and are closely adjacent to one another if distance e substantially satisfies the relationship $e=fd/w$. Corresponding zones 31'', 32'', 33'' are disposed on the opposite side of axis A to receive the divergent rays of the reflected beams symmetrical to those shown in FIG. 3. These zones will be of rectangular outline, geometrically similar to that of entrance end 15, and will be also vertically arrayed to form three rows respectively assigned to the elevational angles of FIG. 2. In the present instance, therefore, sensor 10 will have 18 such zones forming part of respective cells so as to enable the control unit 16 to identify the field of view affected by a detected disturbance. Corresponding alarm indications may be visualized in two dimensions on a display screen observed by a watchman, for example.

Figure 5:
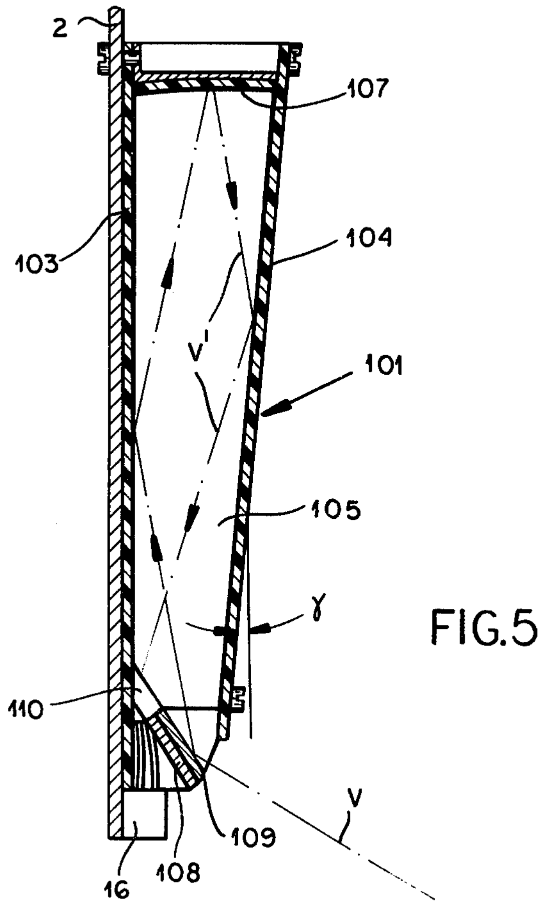
FIG. 5 is a cross-sectional view similar to that of FIG. 2, illustrating a modification.

In FIG. 5 I have illustrated a modified motion detector with a radiation-guiding box 101 having a rear wall 103, a front cover or wall 104 and two lateral walls of which only a wall 105 can be seen. A sloping shelf 108 at an entrance end of that box again supports a planar deflector or mirror 109 while a spherically concave mirror 107 closes the larger, opposite end. Box 101, again mounted on a backing plate 2, differs from box 1 of FIGS. 1 and 2 only in that its front cover 104 is no longer parallel to the rear wall 103 but approaches that wall at an angle of inclination $\gamma$ toward the entrance end. This angle $\gamma$ preferably lies between about 7° and 10° while the angle of convergence $\alpha$ (cf. FIG. 1) may be about 15° in the present instance. The optical axis of the end mirror 107 again lies at the reflecting inner surface of the front cover. FIG. 5 also shows an incident beam V deflected by mirror 109 onto wall 103 and reflected by the latter onto mirror 107 which focuses it into a converging beam V'; the latter, after reflection at the inclined front cover 104, reaches the receiving surface of a pyroelectric sensor 110 here shown to be flush with mirror 109. With suitable dimensioning, as described above, the motion detector of FIG. 5 also responds virtually exclusively to incident radiation from a limited number of discrete fields of view forming a three-dimensional array.

The lateral, front and rear walls of guide boxes 1 and 101 as well as the mirrors 7, 9 or 107, 109 may consist of plastic material whose reflective surfaces are formed by a vapor-deposited aluminum coating. Such a rather inexpensive construction will be satisfactory in many cases since the coatings referred to attenuate the reflected radiation only to a relatively minor extent. For more exacting requirements I may use rolled sheet aluminum with a mirror finish for the flat surfaces and highly polished pressed sheet aluminum for the concave mirror.

The device according to my invention could, of course, also be used with rays of visible light.

I claim:

1. A motion detector responsive to incident radiation, comprising:

an elongate four-sided frustopyramidal box with a first pair of longitudinal walls bisected by a plane of symmetry and a second pair of longitudinal walls converging toward said plane of symmetry from a wider closed end toward a narrower entrance and accessible to incident radiation, at least the walls of said second pair having reflective inner surfaces;

a concave radiation reflector at said closed end with a vertex in said plane of symmetry and a focus near said entrance end; and radiation-sensing means in the vicinity of said focus confronting said concave reflector for illumination by incident beams of parallel rays approaching said entrance end at a plurality of predetermined azimuthal angles with reference to said plane of symmetry and reflected at least once in said box by a wall of said second pair, said radiation-sensing means having a receiving area substantially narrower than said entrance end at least in a direction perpendicular to said plane of symmetry, the length of said box being so related to the angle of convergence $\alpha$ included between said second pair of walls and said plane of symmetry that incoming beams traversing said entrance end at azimuthal angles $\pm(2n+1)\cdot\alpha$ undergo n reflections at said second pair of walls before reaching said concave reflector, n being an integer ranging from 0 to a maximum of 3, said incoming beams being converted by said concave reflector into converging beams undergoing each a further reflection at said second pair of walls before impinging from different directions onto said radiation-sensing means.

2. A motion detector as defined in claim 1 wherein $\alpha$ ranges between substantially 8° and 15°.

3. A motion detector as defined in claim 2 wherein the width w of said entrance end transverse to said plane is sufficient to let incident beams of different azimuthal angles illuminate closely adjoining areas of said concave reflector.

4. A motion detector as defined in claim 3 wherein, with $\alpha \approx 8.5°$, the length of said box is approximately five times said width w.

5. A motion detector as defined in claim 3 wherein said receiving area is divided into a plurality of closely adjoining zones of substantially identical width d in a transverse plane spaced from the focus of said concave reflector by a finite distance considerably less than the focal length f of said concave reflector to enable illumination of each of said zones only by rays of a respective converging beam.

6. A motion detector as defined in claim 5 wherein said finite distance substantially equals fd/w.

7. A motion detector as defined in claim 1 or 2 wherein said box is provided with shield means at said entrance end for blocking the entry of rays incident at azimuthal angles with absolute values substantially less than $\alpha$ and substantially greater than $3\alpha$.

8. A motion detector as defined in claim 1, or 2 wherein said concave reflector is a spherically curved mirror with an optical axis in said plane of symmetry, said first pair of walls also having internally reflective inner surfaces, said box being further provided at said entrance end with a planar reflector bisected by said plane of symmetry and disposed at an angle of inclination relative to said optical axis enabling incident beams at a limited number of different elevational angles to reach said concave reflector and to be returned thereby to said radiation-sensing means after at least one reflection at a wall of said first pair.

9. A motion detector as defined in claim 8 wherein said optical axis is located at the inner surface of one of the walls of said first pair.

10. A motion detector as defined in claim 9 wherein said radiation-sensing means is disposed at the other of the walls of said first pair in a position shielded from incident radiation by said planar reflector.

11. A motion detector as defined in claim 9 wherein the walls of said first pair converge toward said entrance end at an angle of about 7° to 10°.

12. A motion detector as defined in claim 8 wherein said angle of inclination is about 35°.

13. A motion detector as defined in claim 8 wherein said optical axis is substantially vertical.

* * * * *